US008400961B1

(12) United States Patent
Islam et al.

(10) Patent No.: US 8,400,961 B1
(45) Date of Patent: Mar. 19, 2013

(54) WIRELESS MULTIMEDIA BROKERAGE SERVICE FOR REAL TIME CONTENT PROVISIONING

(75) Inventors: Farhad Fuad Islam, Cary, NC (US); Christopher Amidon, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 869 days.

(21) Appl. No.: 11/845,414

(22) Filed: Aug. 27, 2007

(51) Int. Cl.
*H04W 4/00* (2009.01)

(52) U.S. Cl. .......... 370/328; 725/87; 725/101; 725/115; 725/145

(58) Field of Classification Search .................. 370/328, 370/331; 705/14, 80; 725/87, 91, 101, 103, 725/114, 115, 116, 144, 145, 146
See application file for complete search history.

(56) References Cited

U.S. PATENT DOCUMENTS

| | | | |
|---|---|---|---|
| 5,794,210 A | 8/1998 | Goldhaber et al. | |
| 5,974,398 A | 10/1999 | Hanson et al. | |
| 6,310,859 B1* | 10/2001 | Morita et al. ................. | 370/235 |
| 6,507,727 B1 | 1/2003 | Henrick | |
| 6,556,217 B1* | 4/2003 | Makipaa et al. .............. | 345/667 |
| 7,496,647 B2* | 2/2009 | Karaoguz et al. ............. | 709/223 |
| 2003/0060157 A1 | 3/2003 | Henrick | |
| 2003/0063072 A1 | 4/2003 | Brandenberg et al. | |
| 2004/0125136 A1 | 7/2004 | Wallenius | |
| 2004/0128324 A1* | 7/2004 | Sheynman et al. ........... | 707/200 |
| 2005/0049886 A1* | 3/2005 | Grannan et al. .................. | 705/1 |
| 2005/0190901 A1* | 9/2005 | Oborn et al. ............. | 379/114.02 |
| 2005/0198353 A1 | 9/2005 | Zmrzli | |
| 2005/0266835 A1 | 12/2005 | Agrawal et al. | |
| 2006/0059509 A1 | 3/2006 | Huang et al. | |
| 2006/0133407 A1* | 6/2006 | Kuisma ........................ | 370/447 |
| 2006/0259359 A1 | 11/2006 | Gogel | |
| 2007/0010195 A1 | 1/2007 | Brown et al. | |
| 2007/0094691 A1 | 4/2007 | Gazdzinski | |
| 2007/0099560 A1 | 5/2007 | Bowen et al. | |
| 2007/0287498 A1 | 12/2007 | Wang et al. | |
| 2008/0009268 A1 | 1/2008 | Ramer et al. | |
| 2008/0103789 A1* | 5/2008 | Paila et al. ........................ | 705/1 |
| 2009/0031006 A1 | 1/2009 | Johnson | |
| 2010/0131584 A1 | 5/2010 | Johnson | |

FOREIGN PATENT DOCUMENTS

| | | |
|---|---|---|
| EP | 1 292 081 A2 | 3/2003 |
| WO | WO 02/21831 A2 | 3/2002 |
| WO | WO 2004/036902 A1 | 4/2004 |
| WO | WO 2004/080098 A1 | 9/2004 |
| WO | WO 2006/036207 A1 | 4/2006 |
| WO | WO 2006/115911 A2 | 11/2006 |

* cited by examiner

*Primary Examiner* — Bo Hui A Zhu
(74) *Attorney, Agent, or Firm* — Withrow & Terranova, PLLC (57) ABSTRACT

A wireless multimedia brokerage service supports sharing of real-time multimedia content whereby a mobile device user can perceive real-time content from a device in visual proximity, such as a nearby display device, and share the content of the display device with another mobile terminal user without the need to download or otherwise directly access the real-time content. The brokerage service can handle the transactional details of obtaining rights to the real-time content and also manage establishing and terminating a real-time multimedia session with the device(s) of the recipient user(s). In some embodiments, the wireless multimedia content brokerage service can proactively obtain subscriptions to content providers based on the location of one or more users. The brokerage service can also proactively obtain and buffer real-time content after receiving a request to share the content, with the buffering allowing for content to be preserved while the recipient user or users are contacted. The content can then be pushed or otherwise provided to the recipient(s).

18 Claims, 6 Drawing Sheets

| SUBSCRIBER | SERVICE PROVIDER | SERVICE TYPE | SERVICE SUB TYPE | DEVICE | IP/SIP ADDRESS | USER PRESENCE |
|---|---|---|---|---|---|---|
| USER 128 | SP-1 | RT MMC BS | CONTENT PUSH | MOBILE TERMINAL | ... | LOCATION A |
| USER 136 | SP-1 | RT MMC BS | | MOBILE TERMINAL | ... | LOCATION B |
| LDD 124 | SP-2 | RT MMC | PLAYBACK | LDD | ... | LOCATION A |
| LDD 200 | SP-4 | RT MMC | PLAYBACK | LDD | | LOCATION C |
| BROKERAGE AGENT 112 | SP-2, SP-4 | RT MMC | PLAYBACK | SERVER | ... | ... |
| ... | ... | ... | ... | ... | ... | ... |

*FIG. 6*

WIRELESS MULTIMEDIA BROKERAGE SERVICE FOR REAL TIME CONTENT PROVISIONING

BACKGROUND

Handheld personal mobile terminals, including, but not limited to, cell phones and other portable computing devices with network connectivity, are becoming the constant companion of contemporary individuals. Advances in both computing capability and network capability, such as communication protocols and data capacity, have allowed for the proposal and introduction of various types of advanced communication networks. For example, various types of wireless broadband systems have been proposed and implemented. For example, the IMS (IP Multimedia Subsystem) is an architectural framework for delivering IP multimedia services to end users. Continuing developments in technology have led to opportunities to introduce new communication options for users of personal mobile terminals.

SUMMARY

An individual may encounter numerous types of real time multimedia content in the course of everyday life, for example, in a waiting area, such as at an airport or office; at a cafeteria or other public dining area; or even in the outside environment, such when an individual encounters a large display device showing broadcast content in a public area (e.g. Times Square in New York). The individual may wish for the real time content be sent to the personal mobile terminal of one or more other users, such as a friend. However, the individual may be deterred by transactional details, such as the hassle involved with downloading or otherwise accessing the content on his or her own device(s) and any associated subscription requirements.

By way of the subject matter disclosed below, a first user of a personal mobile terminal can "share" real-time content with at least a second personal mobile terminal user without the need for the first personal mobile terminal user to download or otherwise have direct access to the real-time content or the need to subscribe to particular providers of real-time content. As set forth in detail below, a wireless multimedia brokerage service can provide the infrastructure to support such sharing of real-time content.

The wireless multimedia content brokerage service may be associated with one or more providers of communication services, such as cellular or other telephone service; may be associated with a content provider, such as a media company, advertiser, or the like; or may comprise a separate entity that provides real-time content sharing capability to users of personal mobile terminals as a service to such users.

For purposes of clarity in the description below, the term "user" will be used to refer to a person or persons associated with a personal mobile terminal. A "requesting user" is a user who, upon encountering real-time content, desires for the real-time content to be perceived by one or more "recipient users." Of course, a "requesting user" with regard to one instance of real-time content sharing may simultaneously be a "recipient user" with regard to another requesting user.

A user, whether a requesting user or recipient user, may be a customer of an entity that (directly or indirectly) provides wireless multimedia content brokerage service. For instance, in some embodiments, a user may act as a requesting user if the user is a customer of the content brokerage service while no such relationship is required for the user to be a receiving user. However, it should be understood that the present subject matter does not require a specific type of business relationship between the users and the wireless multimedia brokerage service or any other entity.

Generally speaking, in some embodiments, the wireless multimedia content brokerage service has access to information about one or more personal mobile terminal users. Using this information, the wireless multimedia content brokerage service can handle the transactional details of obtaining rights to the real-time content, if needed, and can handle providing the real-time content in a suitable form to one or more other users.

For example, in some embodiments, the wireless multimedia content brokerage service can obtain subscriptions to real-time content or real-time content providers based on the location of one or more users so that, should one of such customers desire to forward real-time content to another user, any delay involved with obtaining rights to that real-time content can be minimal or nonexistent. Furthermore, in some embodiments, the wireless multimedia content brokerage service can obtain and buffer real-time content after receiving the request to share the real-time content, with the buffering allowing for real-time content to be preserved while the recipient user or users are contacted. Thus, depending on the time lag (if any) between the requesting user's request and the ultimate acceptance of real-time content by the recipient user or users, content may be provided in real-time or in near-real-time through use of the wireless multimedia content brokerage service.

Although several examples herein discuss audiovisual real-time content, the present subject matter is not limited to the particular form in which content is perceived. Additionally, "real time content" may comprise not only truly real-time content, but also content perceived and/or provided in near-real-time. Furthermore, in other embodiments, the wireless multimedia content brokerage service may support sharing and pushing non-real-time content, as well.

BRIEF DESCRIPTION OF THE SEVERAL VIEWS OF THE DRAWINGS

A full and enabling disclosure including the best mode of practicing the appended claims and directed to one of ordinary skill in the art is set forth more particularly in the remainder of the specification. The specification makes reference to the appended figures, in which:

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

When data is obtained or accessed between a first and second computer system or component thereof, the actual data may travel between the systems directly or indirectly. For example, if a first computer accesses a file or data from a second computer, the access may involve one or more intermediary computers, proxies, and the like. The actual file or data may move between the computers, or one computer may provide a pointer or metafile that the second computer uses to access the actual data from a computer other than the first computer, for instance.

The various computer systems discussed herein are not limited to any particular hardware architecture or configuration. Embodiments of the methods and systems set forth herein may be implemented by one or more general-purpose or customized computing devices adapted in any suitable manner to provide desired functionality. The device(s) may be adapted to provide additional functionality complementary or unrelated to the present subject matter, as well. For instance, one or more computing devices may be adapted to provide desired functionality by accessing software instructions rendered in a computer-readable form. When software is used, any suitable programming, scripting, or other type of language or combinations of languages may be used to implement the teachings contained herein. However, software need not be used exclusively, or at all. For example, some embodiments of the methods and systems set forth herein may also be implemented by hard-wired logic or other circuitry, including, but not limited to application-specific circuits. Of course, combinations of computer-executed software and hard-wired logic or other circuitry may be suitable, as well.

Embodiments of the methods disclosed herein may be executed by one or more suitable computing devices. For instance, as noted in further detail below, a communications system may comprise one or more systems that can provide wireless multimedia content brokerage services. Such system(s) may comprise one or more computing devices adapted to perform one or more embodiments of the methods disclosed herein. As noted above, such devices may access one or more computer-readable media that embody computer-readable instructions which, when executed by at least one computer, cause the at least one computer to implement one or more embodiments of the methods of the present subject matter. Additionally or alternatively, the computing device(s) may comprise circuitry that renders the device(s) operative to implement one or more of the methods of the present subject matter. Furthermore, components of the presently-disclosed technology, such as subscriber databases, may be implemented using one or more computer-readable media.

Any suitable computer-readable medium or media may be used to implement or practice the presently-disclosed subject matter, including, but not limited to, diskettes, drives, and other magnetic-based storage media, optical storage media, including disks (including CD-ROMS, DVD-ROMS, and variants thereof), flash, RAM, ROM, and other memory devices, and the like.

Software agents are utilized in some embodiments of the present subject matter. Generally speaking, any type of software agent may be used, with the actions of the software agent based on rules, parameters, profiles, and other data provided by the agent's principal or principals, i.e., the individual(s), group(s), or other entity (or entities) configuring the agent's behavior. The degree of autonomy exercised by the agent may vary, and may depend on rules or preferences specified by the agent's principal. In some instances, the rules may provide for the agent to contact one or more persons and/or other agents for additional data, such as confirmation of a course of action or further information required by the agent to evaluate a situation. Agent functionality may be handled by a single agent or coordinated amongst multiple agents. Agent(s) may reside in one computing device or may be distributed amongst multiple computing devices. No particular level of autonomy or "intelligence" is required of a software agent; for instance, in some embodiments, the term "software agent" can refer to a routine or a collection of routines that provide particular functionality.

The present disclosure also makes reference to the relay of communicated data over one or more communications networks. It should be appreciated that network communications can comprise sending and/or receiving information over one or more networks of various forms. For example, a network can comprise a dial-in network, a local area network (LAN), wide area network (WAN), public switched telephone network (PSTN), the Internet, intranet or other type(s) of networks. A network may comprise any number and/or combination of hard-wired, wireless, or other communication links.

A method of operating a wireless multimedia content brokerage service can comprise accessing data defining a location of a each of a plurality of brokerage service customers. For example, the data may be included in a subscription server database accessible by the wireless multimedia content brokerage service. The method can further comprise identifying at least one content provider associated with the location of at least one of the customers and, for each identified content provider, determining the extent of access rights the wireless multimedia content brokerage service possesses with regard to real-time content provided by the content provider.

For example, the wireless multimedia content brokerage service may have access to information that can be used to correlate content providers with user locations. As an example, content providers may be known to provide content to content presentation devices, such as large public display devices that are viewable in public areas. Some content providers may be specific to certain areas and some content providers may be associated with multiple areas. The degree of granularity with regard to the location can vary. For example, content providers can be associated with locations on the national, state or provincial, city, neighborhood, street, or other suitable geographic level. As another example, content providers may be associated with specific geographical coordinates or ranges of coordinate, or may be associated with particular content presentation systems or types of systems.

Determining the extent of access rights can comprise any suitable evaluation routine or routines used by the wireless multimedia content brokerage service to verify that the wireless multimedia content brokerage service has the right to obtain and provide real-time content upon request by a requesting user. For example, determining the extent of access rights with regard to a particular content provider can comprise determining whether the wireless multimedia content brokerage service has an active subscription to the provider's content. The particular type and terms of these subscriptions can vary, and are not intended to limit the present subject matter. For example, a wireless multimedia content brokerage service may subscribe to particular type of content items from a provider (e.g. episodes of a series), all content items from a provider, or may obtain access to content items on a case-by-case basis pursuant to a subscription plan.

In some embodiments, the method can further comprise detecting a change in location of at least one user from a first location to a second location, and determining whether at least one content provider associated with the second location is different from the at least one content provider associated with the first location. This type of dynamic/proactive service management can allow for more efficient system responses to user requests. For example, if a user changes location, the content providers of the second location may be identical, may partially overlap, or may differ substantially from content providers at the first location.

The method can comprise evaluating whether a change in content rights is needed. In some embodiments, if such as change is needed the method can comprise sending rights change request data to at least one content provider, the rights change request data comprising data identifying a requested change in the status of the multimedia content brokerage service's rights with regard to content provided by the at least one content provider. For example, the rights change request data can comprise a request to begin a subscription or to end a subscription.

For instance, a user may be in a first location associated with a first content provider. The wireless multimedia content brokerage service may obtain a subscription or otherwise ensure adequate rights to content provided by the first content provider so that, in the event of a request from the user, the wireless multimedia content brokerage service can obtain and provide content from the first content provider to one or more other (recipient) users. When the user moves to a different location not serviced by the first content provider, the subscription may no longer be needed. Thus, the wireless multimedia content brokerage service can discontinue its subscription (assuming no other users are at or have moved into the first location). Additionally or alternatively, the customer may move to a location associated with a second content provider. If the wireless multimedia content brokerage service does not have rights to content provided by the second content provider, the brokerage service may obtain a subscription.

A method of operating a wireless multimedia content brokerage service can comprise accessing content push request data, with the content push request data comprising data identifying real-time content and at least one recipient user. In response to the content push request data, the method can further comprise obtaining real-time content from the provider of the real-time content item identified in the push request data and buffering the real-time content. For example, the content push request data may identify a content item by specific reference to the item, by reference to the content provider, and/or in any other suitable way. Similarly, the at least one recipient user may be identified by a name (such as an actual name or a user name), a telephone number, or other suitable identifier, such as a SIP address. The real-time content may be obtained in any suitable way. For example, the wireless multimedia brokerage service may transmit a request for the real-time content to the content provider. For example, the transmitted request may comprise a request for access to a stream of the real-time content from the provider. The real-time content may travel over any suitable medium or media.

In some embodiments, buffering begins as soon as feasible in order to preserve the real-time content going forward from the time of the request. While real-time content is buffered, the at least one recipient user may be contacted to determine if the recipient user wishes to receive real-time content from the brokerage service. The method can comprise transmitting the buffered real-time content to the at least one recipient user. In some embodiments, as noted above, the at least one recipient user may indicate (manually or automatically) whether the recipient wishes to receive the real-time content. Accordingly, the method can comprise accessing data indicating whether the recipient wishes to receive the real-time content, with transmission occurring only if the recipient wishes to receive the buffered real-time content. If the recipient does not wish to receive the real-time content, buffering can be discontinued, and, in some embodiments, the customer that originated the content push request can be notified of the recipient's rejection.

In some embodiments, the method may further comprise providing preview data to one or more recipients. For example, the preview data may comprise any suitable audio, visual, textual, and/or other information regarding the content that is to be pushed. The preview data may be generated by the content provider, wireless multimedia brokerage service, and/or other parties. In some embodiments, the preview data comprises select frames or portions extracted from the content. For example, if the wireless multimedia content brokerage service provides the preview, the frames/portions may be extracted from the buffer(s) of the content.

In some embodiments, the content may be optimized for specific device types. For example, a content provider may provide content in a form suitable for a large display device to subscribers using such devices. However, when the content is pushed to a mobile device, the content may be modified, such as reducing data size in order to lower bandwidth required for transmission. Content may be modified at the source (e.g. at the content provider) or by the wireless multimedia content brokerage service.

Figure 1:
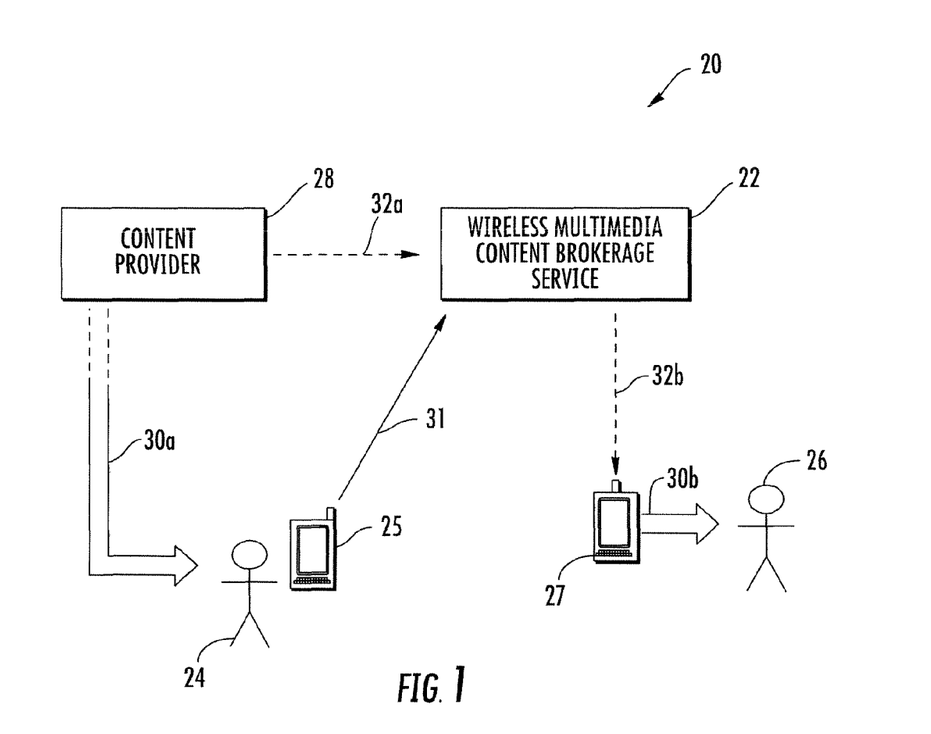
FIG. 1 is a block diagram showing an exemplary contextual overview of a wireless multimedia content sharing event.

FIG. 1 is a block diagram showing an exemplary contextual overview of a wireless multimedia content sharing event. Specifically, as indicated at 20 in FIG. 1, a requesting user 24 perceives real-time content 30A provided by content provider 28. Although not illustrated in detail in FIG. 1, real-time content 30A may be provided directly or indirectly by content provider 28 in any suitable fashion by way of one or more content presentation devices or systems. Upon perceiving the real-time content, requesting user 24 may wish to share the real-time content with one or more recipient users 26, one of which is shown in FIG. 1. Accordingly, requesting user 24 can send a request 31 via a personal mobile terminal 25 to a wireless multimedia content brokerage service 22. Based on request 31, brokerage service 22 can obtain real-time content 30A or data representative of real-time content 30A from content provider 28. In this example, brokerage service 22 is shown as obtaining real-time content data 32A directly from content provider 28. However, in other embodiments, the real-time content data may be obtained indirectly through, e.g., one or more designees of content provider 28.

In some embodiments, the real-time content can be "pushed" to brokerage service 22 from content provider 28. "Push" technology generally refers to the style of communication protocol wherein the request for a given communication transaction originates with the publisher or central server. Thus, once brokerage service 22 has requested information from content provider 28, no further requests are needed as the real-time content is pushed to brokerage service 22. The push request may originate from brokerage service 22 at the time brokerage service 22 receives the push request from requesting user 24. However, in other embodiments, brokerage service 22 may send a request for real-time content to be pushed from content provider 28 as part of a subscription to content from provider 28.

In any event, based on information included in request 31, brokerage service 22 can itself transmit real-time content to recipient user device 27. For example, brokerage service 22 may push the real-time content in some embodiments. This is shown in FIG. 1 where real-time content data 32B is pushed to device 27 which then outputs real-time content 30B for perception by recipient user 26. Thus, recipient user 26 can experience the real-time content 30 being perceived by requesting user 24 in real time or in near-real time without the need for requesting user 24 to download or otherwise receive the real-time content on device 25, or on any other device associated with requesting user 24 for that matter. As will be set forth in the examples below, the use of a wireless multimedia content brokerage service such as service 22 allows for this new type of communication to occur in a manner that is largely transparent to requesting user 24, recipient user(s) 26, as well as content provider 28.

For example, from the point of view of content provider 28, wireless multimedia content brokerage service 22 is simply another push recipient of real-time content. Requesting user 24 does not need to obtain a subscription to content provider's 28 content, nor does requesting user 24 need to perform any complex operations to alert recipient user 26 of the real-time content, such as directing recipient user 26 to a website, or providing another indicator of where to obtain real-time content. From the point of view of recipient user 26, real-time content is simply received at device 27 with little or no effort required by recipient user 26. As will be set forth below, in some embodiments, recipient user 26 may preview and/or reject incoming content or otherwise exercise control over what is obtained at device 27 as a matter of preference.

Figure 2:
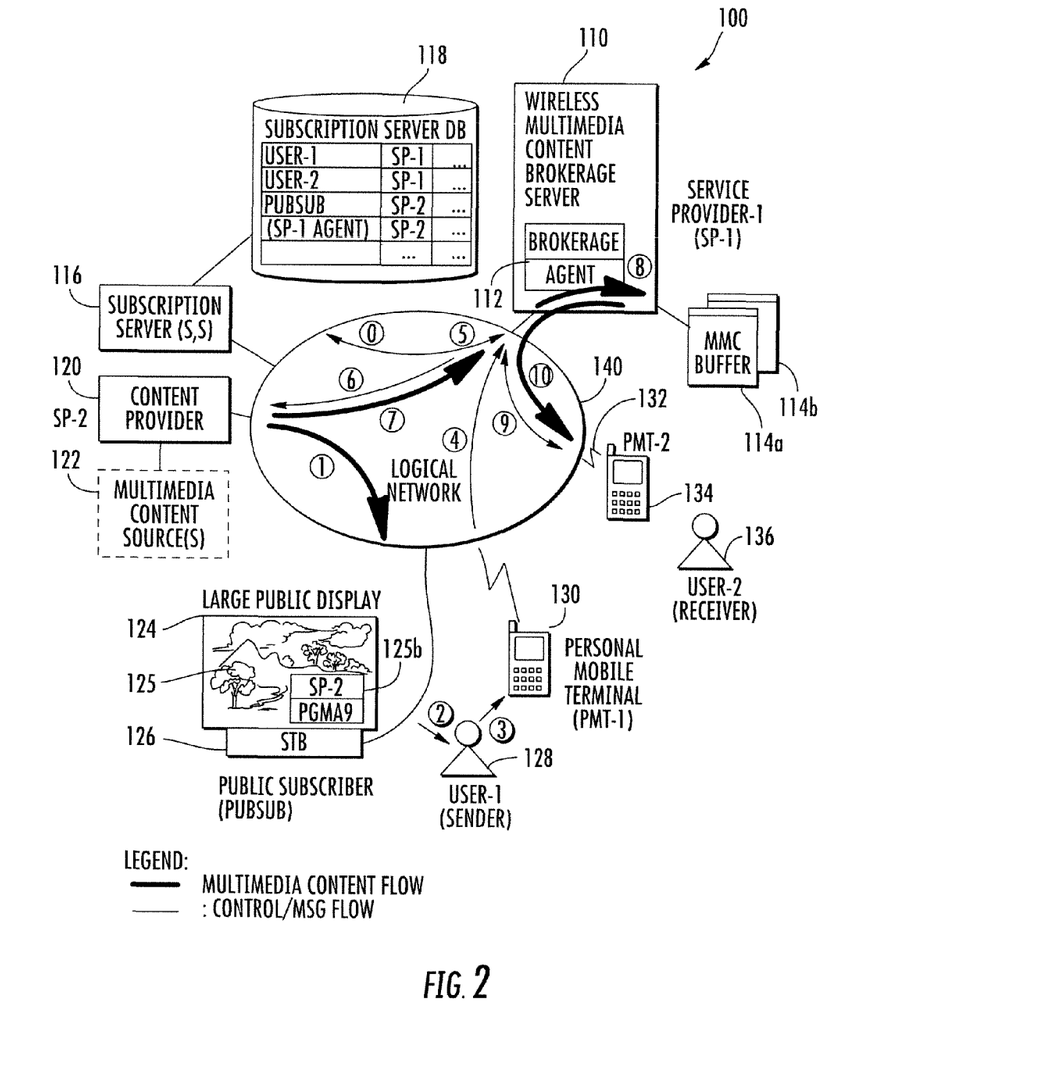
FIG. 2 is a block diagram showing an exemplary system architecture and exemplary signal flows in a communications system that comprises a provider of wireless multimedia content brokerage services.

Turning now to FIG. 2, an exemplary system architecture in a communication system comprising a wireless multimedia content sharing system is shown generally at 100, along with multimedia and control/message flows. In this example, a wireless multimedia content brokerage server 110, comprising one or more suitable computing devices, uses a brokerage software agent 112 to provide wireless multimedia content push services. Wireless multimedia content brokerage server 110 maintains one or more content buffers 114, shown in this example as 114A and 114B. Buffers 114 can be used to simultaneously buffer and extract real time multimedia content received from one or more content providers to ensure that a requested playback point is not lost and playback can start to recipient users from the respective requested playback points. Server 110 is in communication with a subscription server 116 which provides access to subscription server database 118. Subscription server database 118 contains information regarding various users involved with the wireless multimedia content brokerage system.

FIG. 2 shows a single subscription server 116 with access to a single subscription server database 118. However, it will be understood that, depending upon the system architecture and service providers involved, wireless multimedia content brokerage server 110 may obtain information from multiple subscription servers 116 each associated with a subscription server database 118. In the event information is obtained from multiple sources, the wireless multimedia content brokerage service may maintain its own subscription server database 118 (along with a subscription server 116) aggregating data from the multiple sources. As further examples, one or more wireless providers (or other providers of network connectivity) may maintain database 118, or database 118 may comprise one or more publicly-available databases maintained by a third party and used by various providers (and users) to coordinate services.

FIG. 2 further illustrates content provider 120 with access to multimedia content source(s) 122. As an example, multimedia content source(s) 122 may comprise one or more databases, archives, or other systems configured to access media content fixed in a tangible medium. As another example, content source(s) may comprise live content feeds. The particular manner in which content provider 120 obtains, stores, and provides content is not essential to the present subject matter. For example, content provider 120 may comprise any suitable entity that provides audio, video, or other content over any suitable medium or media, including content provided via computer networks (e.g. the internet), cable television networks, broadcast media, or in other ways. However, in the context of the present subject matter, content provider 120 is one that is typically capable of providing real-time streaming content over one or more networks in a manner such that the information can be obtained and buffered by wireless multimedia content brokerage server 110.

FIG. 2 further illustrates exemplary content presentation system 124, in this example a large public display connected to a set top box 126. In this example, content presentation system comprises a set top box 126 used to connect large public display 124 to communications network 140 which, in this example, serves as a link between the other components of the system. The logical network 140 illustrated in this example implies that the communications network may comprise multiple independent or related networks. For instance, a first network may be used for streaming real-time content from provider 120 to content presentation systems and a second network may be used to push content from content brokerage server 110 to one or more recipient users.

For example, large public display 124 may comprise a television viewable in a public area, such as a waiting room or open space in an urban environment. Depending upon the particular circumstances, display 124, set top box 126, and/or additional components may present real-time video and/or audio content to persons in audiovisual proximity to the display. In this example, display 124 is providing video 125 along with content identifier 125B, which may comprise a digital on-screen graphic or text (sometimes referred to as a "bug") and/or other information that indicates metadata about the content and/or provider of the content. For example, indicator 125B may comprise an identification of the content provider and the program being shown on display 124.

In other embodiments, content metadata such as identifier 125B may additionally or alternatively be made available in any suitable data form to requesting user 124's mobile terminal(s) 130. For example, the content presentation system may provide data via a wired or wireless connection, such as via Bluetooth, Wireless LAN, or any other suitable manner.

Although the examples herein relate to multimedia content presented via a large display device, it is to be understood that the present subject matter is not intended to be limited to particular types of content or particular mode or manner of presentation. For example, other content presentation systems may provide 3-D content (with or without audio), video-only content, audio-only content, or other content. Generally speaking, the present subject matter allows for data representative of any content that changes over time to be forwarded to one or more recipient users. The number and arrangement of devices used to perceive the content can vary. For example, the sending user may initially perceive content from one or more devices working in concert. Additionally or alternatively, a recipient user may receive content on a single device or via multiple devices.

Content 125 may be viewed by user 128, who desires to send a request so that one or more other users, such as user 136, receive content 125 on a mobile device. User 128 (a requesting user of this example) uses a personal mobile terminal 130 to send a request to wireless multimedia content brokerage server 110 to provide content 125 to personal mobile terminal 134 associated with user 136 (a recipient user in this example). Particular aspects of the content brokering operation will now be discussed with reference to communications that occur over network 140.

As indicated at 0 in FIG. 2, at some point prior to the content push request there is an initialization between brokerage agent 112 and the subscription server database 118 whereby the brokerage agent 112 registers its decision to become a subscriber of various content providers, such as content provider 120. For example, in some embodiments, subscription server database 118 is used as a clearinghouse where content providers and other service providers, such as wireless multimedia content brokers, network providers, and others can coordinate subscription and device status.

At 1, content is shown flowing from content provider 120 to large display device 124 that is in visual proximity of user 128. At this point, user 128 may decide to push the content to user 136. Using, for example, a thin client application from the service provider(s) associated with server 110 and running on personal mobile terminal 130, user 128 can send a request to wireless multimedia content brokerage service to push content 125 to user 136. The request is shown at 4 in FIG. 2.

For example, user 128 may input data such as the identity of the content provider and/or program as indicated at 125B on display 124. However, in other embodiments, personal mobile terminal 130 may receive content metadata directly from large display 124 or other associated hardware, such as set top box 126, so as to not require manual input of content data. User 128 can specify the identity of user 136 in any suitable manner, for example, by selecting user 136 from a list of contacts stored using device 130 or accessible by device 130.

At 5 in FIG. 2, wireless multimedia content brokerage server 110 contacts subscription server 116, if needed, to register as a subscriber to content provider 120 if such registration has not already occurred. At 6, brokerage agent 112 sends a request for real time content push to begin from the playback point identified by user 128. For example, user 128 may identify a specific start and end time for content. Alternatively or additionally, start and/or end times may be determined based on when wireless multimedia content brokerage server receives a request from device 130.

In any event, responsive to the request from brokerage agent 112, content provider 120 begins pushing content 125 to wireless multimedia content brokerage server 110. This is indicated in FIG. 2 at 7. As shown at 8, brokerage agent 112 begins buffering the received content using one or more of buffers 114. Brokerage agent 112 may have access to one or more buffers of any suitable form. For example, multiple buffers may be provided for handling content forwarding events; any particular content forwarding instance can use one or more buffers. As shown at 9, brokerage agent 112 contacts user 136 via personal mobile terminal 134 in order to notify user 136 of incoming content. For example, depending upon user's 136 preference, brokerage agent 112 may send a notification and/or a preview of the content prior to beginning push of the actual content. For instance, in some embodiments content push may not begin until data has been received indicating that user 136 approves of the content. If user 136 agrees to accept the content, then brokerage agent 112 initiates multimedia content flow from buffer 114 while simultaneously continuing to buffer incoming real-time content from provider 120. In some embodiments, user 128 may receive a notification regarding acceptance (or rejection) by user 136. Content pushed to device 134 is shown at 10 in FIG. 2.

In this example, buffers 114A and 114B are used since real time content is being provided by content provider 120 without considering the status or locations of users 128 and 136. In fact, from the point of view of content provider 120, users 128 and 136 are not even subscribers. However, due to the presence of wireless multimedia content brokerage server 110, users such as user 128 and 136 can provide useful or otherwise interesting content to other users without the need to become subscribers of providers such as service provider 120. Of course, in other instances, it is possible for either user to be a subscriber of content provider 120, but possession of such a subscription on the part of a requesting or receiving user is not required using the present subject matter.

Figure 3:
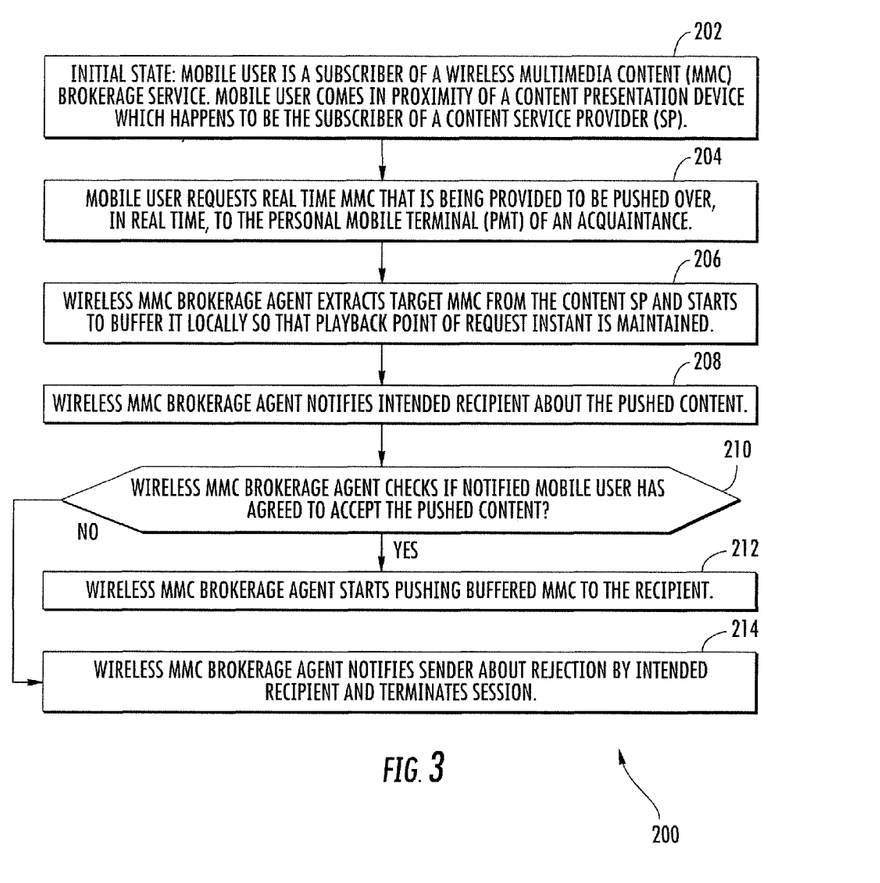
FIG. 3 is a flowchart showing steps in an exemplary process for sharing real-time content via a system that can provide wireless multimedia content sharing services.

Turning now to FIG. 3, steps in an exemplary process 200 for providing a wireless multimedia content brokerage service are illustrated. Step 202 illustrates the initial state of various participants defined in the context of the wireless multimedia content sharing event. Specifically, a mobile user is a subscriber of or otherwise associated with an entity that provides wireless multimedia content brokerage services. The user comes in proximity to content, such as at a large display device which is a subscriber or otherwise possesses rights to display content from a content service provider. At step 204, the mobile user requests for the real time multimedia content that is being played back by the content presentation system to be pushed in real time to the personal mobile terminal of one or more other users, such as an acquaintance. This request, which may comprise any suitable format, can include data identifying the content provider and/or the particular content perceived by the requesting user. At 206, based on the data included in the request, the wireless multimedia content brokerage service agent obtains the desired multimedia content from the content service provider and buffers it locally so that the playback point at the time of the initial request is maintained. For example, the brokerage agent may obtain a subscription to content from the content service provider or, if a subscription is already available, the brokerage agent may send a request for the content to be pushed to the brokerage agent for buffering. At step 208, the brokerage agent notifies the intended recipient or recipients about the pushed content. Step 208 may occur simultaneously to step 206 in some embodiments. At step 210, the brokerage agent determines whether the recipient user has agreed to accept the push content. For example, the agent may stand by for a particular time period during which the recipient user can provide a response. At step 212, if the agent determines that the recipient user will accept the push content, the brokerage agent begins pushing the buffered multimedia content to the recipient. If, at step 210, the agent determines the recipient does not accept the content, then at step 214 the agent notifies the sender about rejection by the intended recipient and terminates the session. For example, the agent may discontinue buffering the content.

Figure 4:
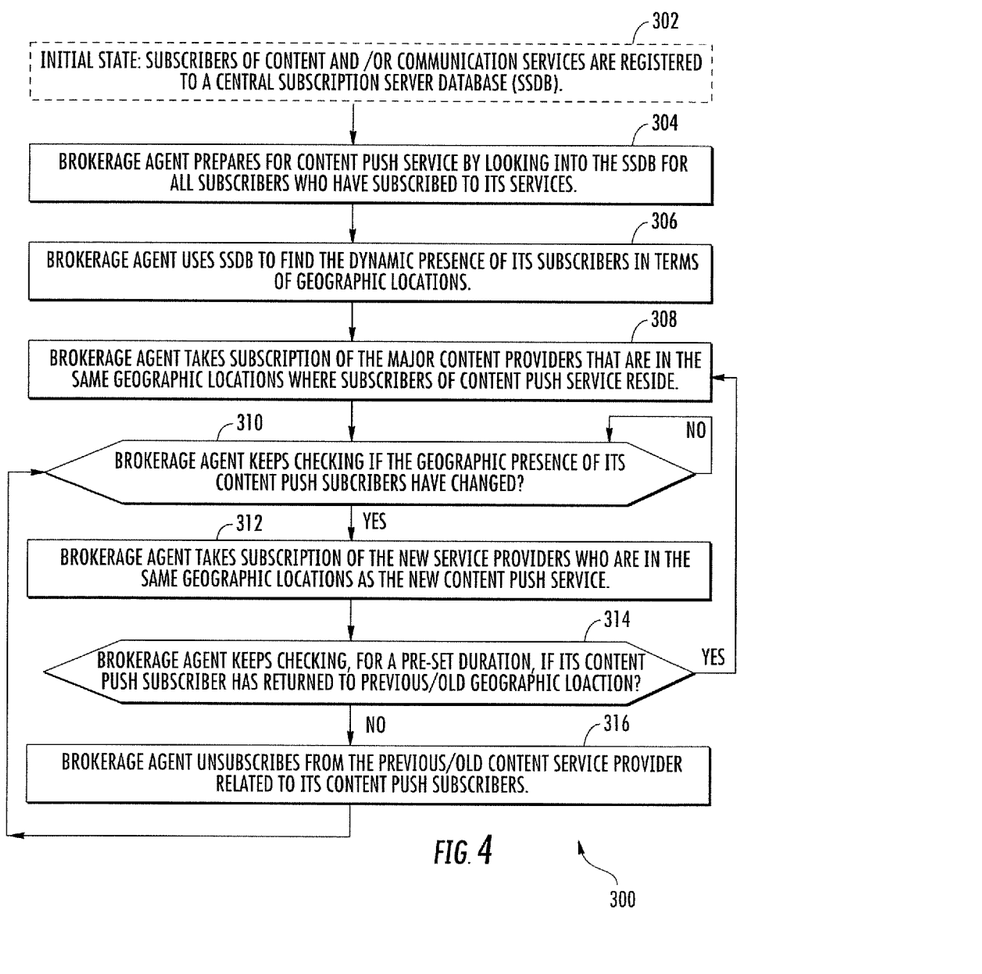
FIG. 4 is a flowchart showing steps in an exemplary process for managing or operating aspects of a system that can provide wireless multimedia content sharing services.
Figure 5:
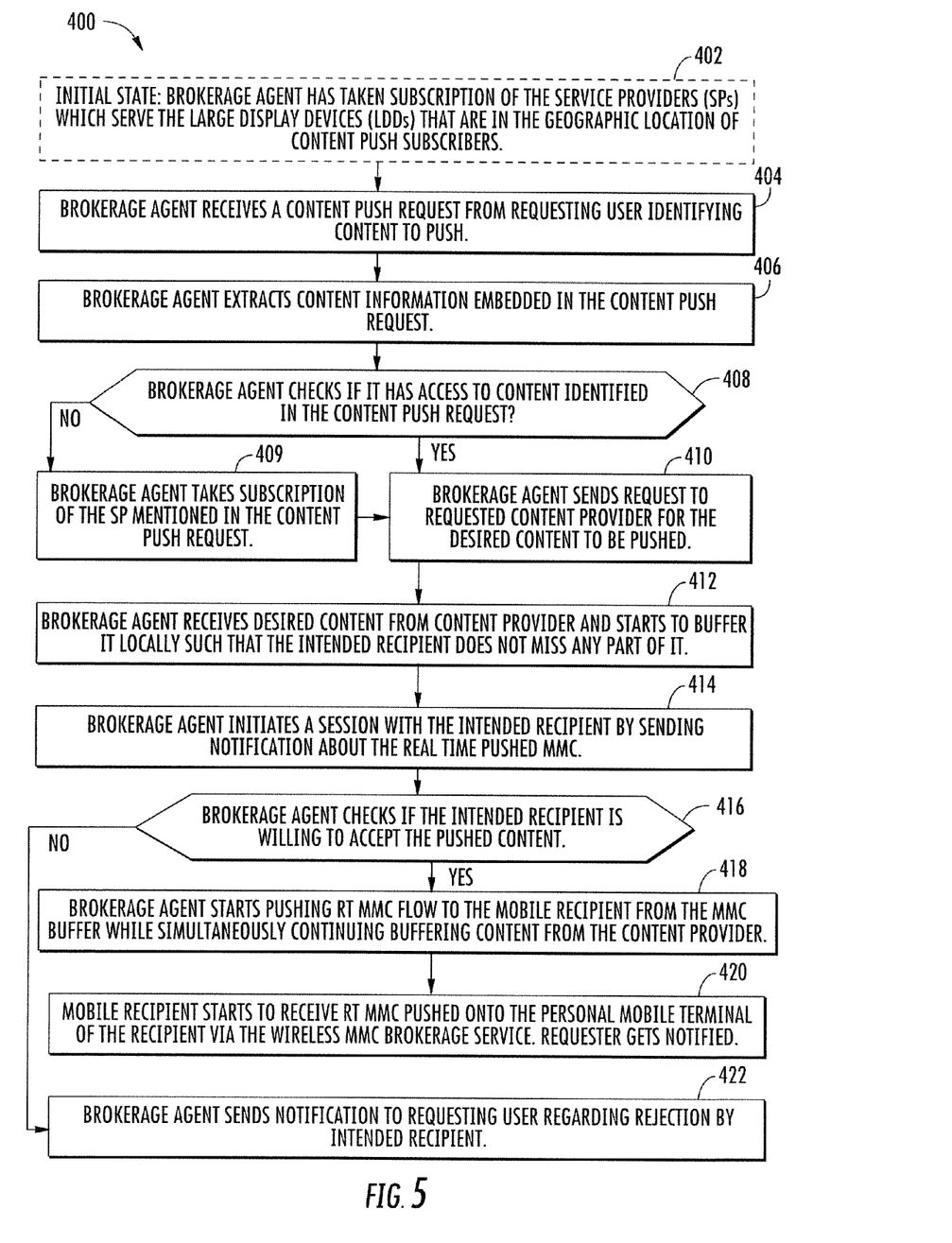
FIG. 5 is a flowchart showing steps in an exemplary process for pushing real-time content using aspects of a system that can provide wireless multimedia content sharing services.

Turning now to FIGS. 4 and 5, exemplary processes for performing tasks related to the efficient and effective management of a multimedia content brokerage service will now be discussed. FIGS. 4 and 5 refer to a subscriber database; an example of the database is discussed in further detail below with reference to FIG. 6.

Beginning with FIG. 4, an exemplary process 300 of managing a wireless multimedia content brokerage service is discussed. Step 302 represents an initial state of the service. Namely, a central subscription server database is maintained and subscribers of content and/or communication services are identified in the database. For example, if a wireless multimedia content brokerage service is associated with or is a part of a communication provider (such as a wireless service provider) the database may identify various users of the service provider, including users of personal mobile terminals and other devices, such as multimedia content display devices such as large displays. The database may be a feature of the wireless architecture, or may be prepared and maintained by the wireless multimedia content brokerage service by obtaining data from multiple sources. In alternative embodiments, the database may comprise multiple databases provided by various different entities. As another example, the database may be maintained by one or more third parties to facilitate wireless and other communications services for users of one or more communication providers.

In addition to identifying the nature of user subscriptions, the database may also contain real-time location data of users. For instance, in some embodiments, the database comprises the "Home Subscriber Server" of the IMS system. Examples of location include geographic coordinates or identifiers and network coordinates or identifiers. However, any other suitable manner of identifying a location can be used. An example of data maintained by the database is discussed further below in this specification.

In any event, once the database is created, the information maintained therein can be used to facilitate wireless multimedia content brokerage services. At step 304, one or more software agents prepare for providing content push services to end users by accessing the subscription server database to determine which end users have subscribed to multimedia content brokerage forwarding services from the brokerage. At 306, the brokerage agent uses the subscriber database to determine the location of each of its subscribers. The location of each subscriber may be determined at any suitable level of particularity. For example, the agent may determine subscriber location on the basis of a nation, state, city, or other political division, or may utilize other descriptions, such as geographic coordinates, geographic regions, or other suitable descriptors that indicate a location. As another example, location may be identified by one or more network designators, such as a particular cell or cells serving a user in a cellular telephone network; other types of network identifiers/organizers may be used.

The location data may come from any suitable source or sources. For example, device location (and other status data) may be provided by service providers, such as wireless service providers. As another example, device location and state data may be provided to the database by each device, either directly or indirectly.

The particular way in which subscriber location is determined and described can depend on the way or ways in which content providers are associated with geographic locations. At step 308, the agent determines which content providers are associated with the geographic locations of the content push service subscribers. For example, content providers may be associated with certain countries, states, or cities. As another example, content providers may be associated with certain regions, certain portions of a city, or certain areas, such as airports or other particular venues. As a further example, content providers may be associated with certain designators of network area, such as particular ranges of cells in a cellular telephone communications network.

In some embodiments, the brokerage agent obtains a subscription to major content providers, but not all content providers. For example, the brokerage service may define certain standards regarding which content providers are major and which content providers are not major in order to avoid subscribing to all content providers associated with a particular area.

Additionally or alternatively, subscription decisions may be made based on inferring content providers from device types. For example, in some embodiments, a brokerage service may subscribe to content providers associated with certain types or classes of devices that comprise suitable public content presentation systems based on evaluating device type data obtained from subscription database.

Step 310 represents an ongoing task or process in which the brokerage agent monitors the database to determine if the location of one or more end users has changed. At step 312, if a subscriber does change location, the agent determines whether additional content providers associated with the new location should be subscribed to. If so, the brokerage agent obtains a subscription to the new service provider or providers. At step 314, the brokerage agent monitors one or more users who have changed location to determine if such users return to a previous location. This monitoring may occur for a pre-determined period of time in order to ascertain, for example, whether a user has briefly crossed a state line, has made a journey of short duration (e.g. a day trip), or has otherwise briefly entered a new area with different service providers. If, at step 314, the agent determines that the user or users have returned to the previous location, the routine returns to step 308 where subscriptions to the content providers associated with the initial location are maintained and/or renewed. However, if at step 314 the agent determines that the user has not returned after a pre-determined time period, then at step 316 the agent un-subscribes from one or more content service providers associated with the initial location. However, it is worth noting that the subscription may not necessarily be discontinued in all instances. For example, a first and second user may be associated with a first location served by one or more particular content providers. The second user may move to a different location not associated with the content providers. However, since the first user has remained in the initial location, the service can continue its subscription to the content provider associated with the first location.

FIG. 5 is a flow chart showing steps in an exemplary process 400 for receiving a content push request and responding thereto, such as by providing content to one or more recipient users. Step 402 represents an initial state where a brokerage agent has obtained a subscription to one or more content providers that provide content at a geographic location associated with content push service subscribers. At step 404, a brokerage agent receives data from a content push requesting user identifying content to push. As was noted earlier, the content may be identified by data that indicates a particular service provider and/or content item. For example, a requesting user may view an identifier of a network or program, input identification data to a personal mobile terminal, and send a message comprising request data to the wireless multimedia content brokerage service. At step 406, the brokerage agent accesses data and extracts content information included in the content push request data. Based on the content information, at step 408, the brokerage agent determines whether it has access rights to the content from the content service provider identified from the request data. For example, the brokerage agent may consult a database (an example of which is described below) to determine if the brokerage service has subscribed to content from the service provider. At step 409, if a subscription or other rights are needed, the brokerage agent obtains a subscription (or otherwise obtains appropriate clearance) to obtain content from the provider.

The particular manner in which the brokerage agent obtains a subscription is not essential to the present subject matter. For example, content providers and brokerage services may communicate via a common protocol setting forth a subscription request, cancellation, and modification technique whereby the subscription process can be handled automatically at least on the part of the brokerage service. The subscription transactions may be handled directly by the content provider(s) and/or may be partially or completely delegated.

At step 410, once a subscription is obtained (or if a subscription was already obtained), the brokerage sends a request for the desired content to be pushed to the brokerage. For example, a request may be sent to the content provider for the content. At step 412, the brokerage agent receives the pushed content and begins buffering it locally in order to preserve the content from the point at which the request was received. At step 414, the agent initiates a session with the intended recipient user, for example by sending a notification such as an instant message regarding the real time push multimedia content. For instance, the message may be indicated as originating from the requesting user so that the intended recipient user can identify the original source of the request. At step 416, the brokerage agent accesses data to determine if the intended recipient is willing to accept the push content. For example, the brokerage agent may monitor for a response from the intended recipient user and, if such a response is received, base its further actions on the type of response. At step 418, if the response indicates that the user is willing to accept the content, the brokerage agent begins pushing multimedia content to the recipient user from the buffer while simultaneously continuing to buffer incoming content from the content provider. Namely, content is pushed from the beginning of the buffer so that the recipient user receives content that was available (and pushed to the brokerage service) at or near the time of the requesting user's request.

Step 420 represents an optional step whereby the brokerage service receives data indicating that the mobile recipient user has begun receiving content. For example, the personal mobile terminal of the recipient user may send a confirmation message that the pushed content has begun. The requesting user may be notified by the brokerage agent that the content forwarding has been successful. Returning to step 416, if the brokerage agent determines that the recipient user is not willing to accept the content, the brokerage agent sends a notification to the requesting user stating that the recipient has rejected the content. Buffering may also be discontinued once the agent has determined the recipient does not wish to accept the push content. Rejection may be indicated by an explicit message from the recipient user, such as a reply to the initial notification indicating rejection. However, rejection may be inferred in some embodiments from a failure by a recipient user to reply to the initial notification. If a particular push is rejected by all recipients, the buffer(s) used to support the push can eventually be flushed and cleared.

When a recipient accepts the real-time pushed content, the wireless brokerage agent continues to buffer incoming real-time content for the duration of the content item. Once a content item is completed, the content provider will end its push of data to the wireless multimedia content brokerage service. The service can continue to output real-time content in the buffer until the end of the content is reached in the buffer. The end point of the content of interest can be indicated in any particular way, for example, by a follow-on message from the wireless multimedia content brokerage service. Of course, the system may support features whereby a recipient user can discontinue receipt of content at any desired time.

Figure 6:
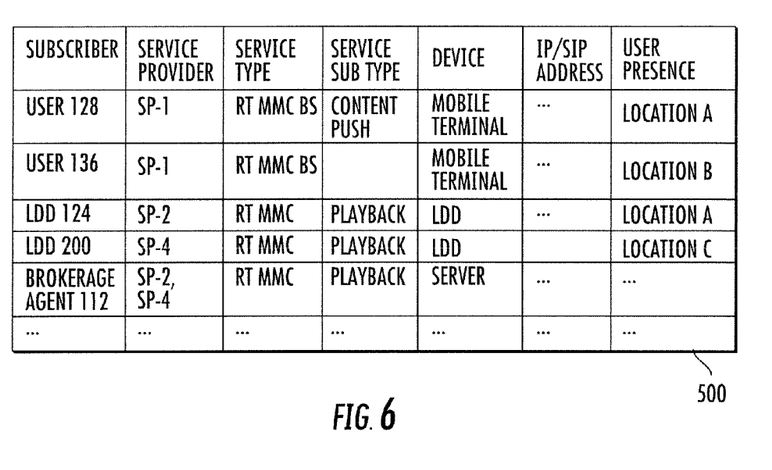
FIG. 6 illustrates an exemplary dataset that may be used in some embodiments of a system that can provide wireless multimedia content sharing services.

FIG. 6 is an illustration of an exemplary data set 500 that may be maintained in one or more subscription server databases accessible by the wireless multimedia content brokerage service. The database(s) may be maintained in any suitable logical and/or physical form, of course. In this example, each record identifies a subscriber, one or more service providers associated with the subscriber, one or more service types, one or more service sub-type identifies, a device identifier, and state data. In this example, the state data comprises an IP/SIP (internet protocol) address and an indicator of user presence. The user presence indicator may, for example, indicate the geographic, network, or other location of a user, and may additionally comprise other information, such as whether a device has provided information indicating that the device is in active use by a user.

In this example, the records are illustrating one exemplary hypothetical dataset that corresponds to the examples discussed in conjunction with FIG. 2 above. Namely, in this example, a record is maintained for user 128, user 136, large display device 124 (or a subscribing entity associated therewith), large display device 200 (not discussed in conjunction with FIG. 2), and wireless multimedia content brokerage service agent 112. Users 128 and 136 are each indicated as subscribers of real time multimedia content brokerage services, specifically content push for mobile terminals. Large display device 124 is shown as a subscriber of service provider SP-2, which corresponds to content provider 120. The particular subscription for large display device 124 is indicated as real time multimedia content only (no brokerage service), specifically playback of content from provider 120. Acting as a user, brokerage agent 112 is a subscriber of content provider 120 and additional content provider SP-4 not illustrated in FIG. 2. The particular subscriptions are for real time multimedia content playback, with the "device" indicating that the subscription is for a "server" that allows for buffering, storage and forwarding to other users.

The location of user 128, illustrated generally as "Location A", is the same as large display device 124. The same identifier is used in FIG. 6 for ease of illustration. The locations may not necessarily be identical, however. For example, for purposes of content brokerage, the "same" location may not be required; rather, a predefined proximity to one or more content presentation systems may suffice. User 136 is indicated as being at "Location B," a different location from user 128. Large display device 200, which was not discussed in FIG. 2, is at a still further "Location C" and is serviced by provider SP-4. For example, other subscribers of the wireless multimedia content brokerage service may be at or proximate to Location C and thus the wireless multimedia content brokerage service may maintain a subscription to provider SP-4. Additionally, it will be understood that data may change dynamically, especially for updates as to the location of mobile devices.

Some of the state data is not illustrated in this hypothetical example since such data can vary. For example, the IP/SIP addresses are not illustrated in this example. The addresses may take any suitable form, and are not limited to IP/SIP format. State data updates, such as network addresses, device location, and the like, can be provided by or obtained in any suitable way. For example, some or all of the state data may be provided by the respective providers of communication services, such as cellular or other wireless service providers and/or the devices themselves.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed:

1. A method of operating a wireless multimedia content brokerage service, the method comprising:
   accessing, by a content brokerage server, a content push request generated by a first user, the content push request comprising data identifying a real-time content stream being provided by a content provider to a first device via a communications path which does not include the content brokerage server and being perceived by the first user, the data also identifying at least one push recipient, wherein the at least one push recipient is different from the first user; and
   in response to the content push request:
      determining the content provider of the real-time content stream;
      obtaining, by the content brokerage server, the real-time content stream identified in the content push request from the content provider; and
      transmitting, by the content brokerage server, the real-time content stream to a second device associated with the at least one push recipient while the real-time content stream is being provided to the first device.

2. The method as set forth in claim 1, further comprising, before transmitting the real-time content stream, accessing data indicating whether the at least one push recipient wishes to receive the real-time content stream;
   wherein transmitting comprises transmitting the real-time content stream only if the accessed data indicates that the at least one push recipient wishes to receive the real-time content stream.

3. The method as set forth in claim 1, further comprising:
   in response to the content push request, determining that the wireless multimedia content brokerage service lacks a subscription with the content provider to the real-time content stream, and in response thereto, obtaining a subscription on behalf of the wireless multimedia content brokerage service with the content provider before obtaining the real-time content stream.

4. The method as set forth in claim 1, further comprising: transmitting preview data to the at least one push recipient.

5. A wireless multimedia content brokerage system comprising at least one computing device, the at least one computing device adapted to:
   access, by a content brokerage server, a content push request generated by a first user, the content push request comprising data identifying a real-time content stream being provided by a content provider to a first device via a communications path which does not include the content brokerage server and being perceived by the first user, the data also identifying at least one push recipient, wherein the at least one push recipient is different from the first user; and
   in response to the content push request:
      determining the content provider of the real-time content stream;
      obtaining, by the content brokerage server, the real-time content stream identified in the content push request from the content provider; and
      transmitting, by the content brokerage server, the real-time content stream to a second device associated with the at least one push recipient while the real-time content stream is being provided to the first device.

6. The system as set forth in claim 5, wherein the at least one computing device is further adapted to:
   access data indicating whether the at least one push recipient wishes to receive the real-time content stream;
   wherein transmitting comprises transmitting the real-time content stream only after determining that the at least one push recipient wishes to receive the real-time content stream.

7. The system as set forth in claim 5, wherein the at least one computing device is further adapted to:
   in response to the content push request, determine that the wireless multimedia content brokerage system lacks a subscription with the content provider to the real-time content stream, and in response thereto, obtain a subscription on behalf of the wireless multimedia content brokerage system with the content provider before obtaining the real-time content stream.

8. The system as set forth in claim 5, wherein the at least one computing device is adapted to transmit preview data to the at least one push recipient.

9. A method of operating a wireless multimedia content brokerage service, the method comprising:
   accessing data defining a location of each of a plurality of brokerage service customers;
   identifying at least one content provider associated with the location of at least one of the customers, wherein the at least one content provider provides real-time streaming media content for display only in certain geographic locations, including the location;
   for each identified content provider, determining if the wireless multimedia content brokerage service possesses a subscription to receive real-time streaming media content provided by the identified content provider;
   evaluating whether a change in a status of the multimedia content brokerage service's possession of the subscription to receive the real-time streaming media content provided by the identified content provider is needed; and
   sending rights change request data comprising data identifying a requested change in said status of the possession of the subscription, if such a change is needed.

10. The method as set forth in claim 9, wherein the rights change request data comprises a request to begin the subscription or end the subscription.

11. The method as set forth in claim 9, further comprising:
   detecting a change in location of the at least one brokerage service customer from a fust location to a second location; and
   determining whether at least one content provider associated with the second location is different from the at least one content provider associated with the first location.

12. The method as set forth in claim 11, wherein the rights change request data is sent in response to detecting the change in the location of the at least one brokerage service customer from the first location to the second location.

13. The method as set forth in claim 9, wherein identifying at least one content provider comprises accessing a subscriber database and determining at least one content provider associated with at least one content presentation system proximate to the at least one of the customers.

14. A multimedia content brokerage system comprising at least one computing device, the at least one computing device adapted to:
   access data defining a location of each of a plurality of customers of a wireless multimedia content brokerage service;
   identify at least one content provider associated with the location of at least one of the customers, wherein the at least one content provider provides real-time streaming media content for display only in certain geographic locations, including the location;
   for each identified content provider, determine if the wireless multimedia content brokerage service possesses a subscription to receive real-time streaming media content provided by the identified content provider;
   evaluate whether a change in a status of the multimedia content brokerage service's possession of the subscription to receive the real-time streaming media content provided by the identified content provider is needed; and
   send rights change request data comprising data identifying a requested change in said status of the possession of the subscription, if such a change is needed.

15. The system as set forth in claim 14, wherein the rights change request data comprises a request to begin the subscription or end the subscription.

16. The system as set forth in claim 14, wherein the at least one computing device is further adapted to:
   identify a change in location of at least one brokerage service customer from a first location to a second location; and
   determine whether at least one content provider associated with the second location is different from the at least one content provider associated with the first location.

17. The system as set forth in claim 16, wherein the rights change request data is sent in response to detecting the change in location of the at least one brokerage service customer from the first location to the second location.

18. The system as set forth in claim 14, wherein identifying at least one content provider comprises accessing a subscriber database and determining at least one content provider associated with at least one content presentation system proximate to the at least one of the customers.

* * * * *